June 17, 1941.  B. F. PARR  2,246,317
SANDWICH GRILL
Filed July 31, 1940  2 Sheets-Sheet 1
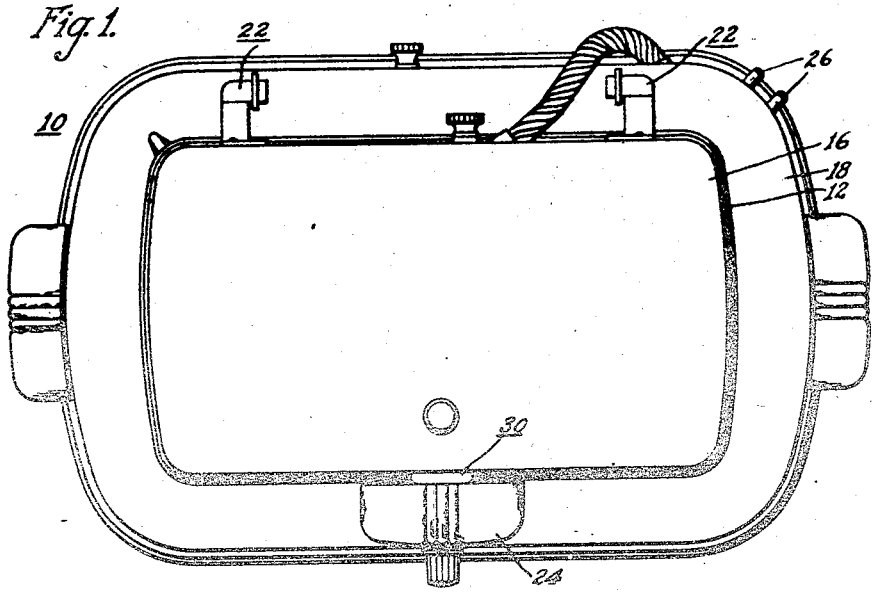
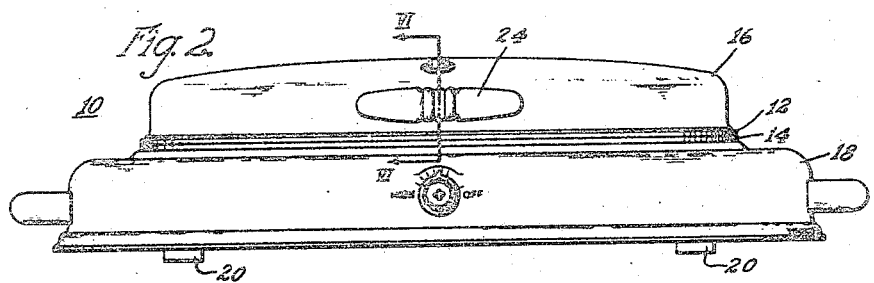
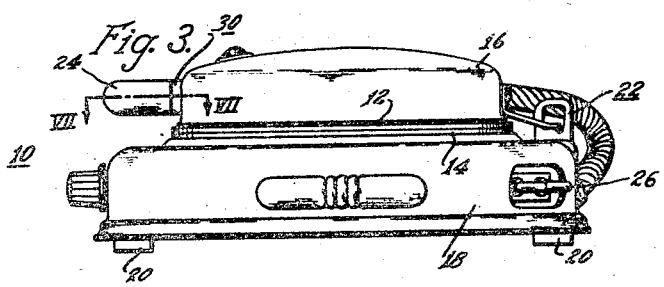
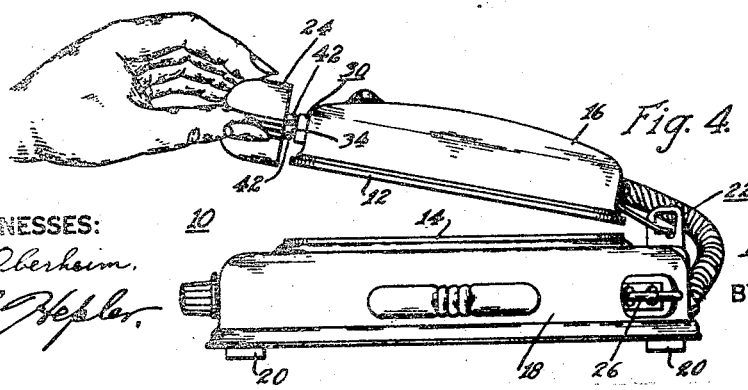
WITNESSES:
E. F. Oberheim.
H. G. Hepler.
INVENTOR
Bernard F. Parr.
BY W. R. Coley
ATTORNEY June 17, 1941. B. F. PARR 2,246,317
SANDWICH GRILL
Filed July 31, 1940 2 Sheets-Sheet 2
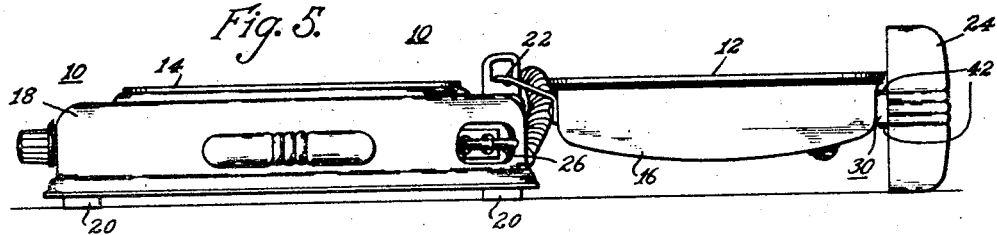
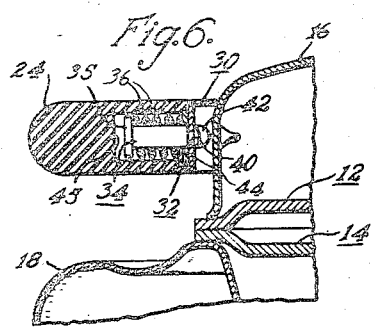 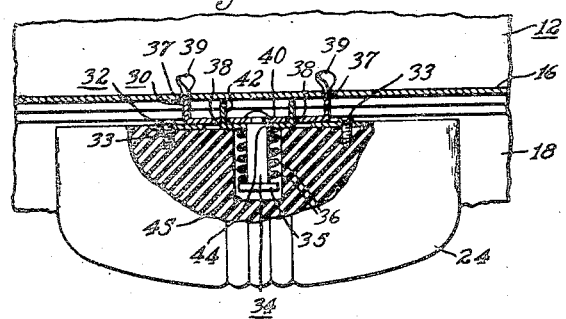
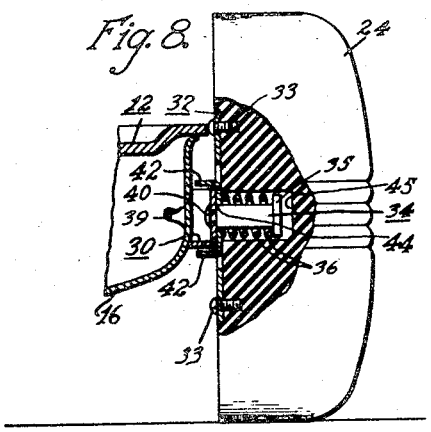
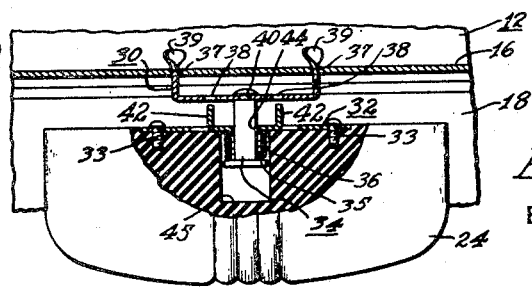
WITNESSES:
E. F. Oberhum
H. G. Hepler
INVENTOR
Bernard F. Parr.
BY
W. R. Coley
ATTORNEY Patented June 17, 1941

2,246,317

UNITED STATES PATENT OFFICE 2,246,317

SANDWICH GRILL

Bernard F. Parr, Mansfield, Ohio, assignor to Westinghouse Electric & Manufacturing Company, East Pittsburgh, Pa., a corporation of Pennsylvania Application July 31, 1940, Serial No. 348,777

8 Claims. (Cl. 53—5)

My invention relates to cooking devices and more particularly to a plural cooking plate structure.

In the designing of cooking apparatus such as sandwich grills, waffle irons, or the like, the exterior appearance thereof is becoming increasingly important as a means for stimulating sales. The exteriorly exposed working parts of the devices must pleasingly conform to the overall configuration of the device, otherwise the sale of such device will be handicapped. There has recently been a material advancement or change in the exterior design or configuration of waffle irons, sandwich grills and the like, and this change in design has required the development of a different type handle (which fits in with the exterior design or configuration) for operating and supporting the upper cooking plate structure of the cooking device.

There are many well known handles which may be used upon the upper plate structure of the cooking device which will satisfactorily perform the simple function of supporting the cooking plate in its open position. However, all known devices are of such character as not to conform to the overall configuration of the cooking device. Considerable effort and expenditure of money has been made to develop a satisfactory handle which may be used with any of the changing designs of the sandwich grills, waffle irons, or the like, which will perform the additional duty of retaining the upper plate in its open position substantially in the plane of the lower plate. However, heretofore no satisfactory double-purpose handle has been developed to my knowledge which conforms with the most modern mechanical and esthetic requirements.

It is therefore an object of my invention to provide a handle mechanism for a sandwich grill, waffle iron, or the like, which pleasingly conforms to the exterior design and configuration of the structure and which may be readily adapted for supporting the upper plate when such plate is in its open operative position.

A further object of my invention is to provide a handle for a sandwich grill, waffle iron, or the like, which is rotatably attached to the upper plate so that such handle may be rotated to permit either end thereof to function as a support for the top plate when such plate is moved to its open position.

Another object of my invention is to provide a rotatable handle for a sandwich grill, waffle iron, or the like, which is biased against the top plate structure and which is retained in either of two operating positions.

Other objects of my invention will either be pointed out specifically in the course of the following description of a device embodying my invention, or will be apparent from such description.

In the accompanying drawings:

Figures 1, 2 and 3 are top, front and side views, respectively, of a sandwich grill embodying my invention;

Fig. 4 is a side view similarly to Fig. 3 illustrating an operator moving the top plate into its open position and rotating the handle mechanism into its second or supporting location.

Fig. 5 is a side elevational view illustrating the device shown in Figs. 1, 2 and 3 with the handle mechanism supporting the top movable plate substantially in the plane of the lower plate;

Fig. 6 is a partial sectional view taken along the line VI—VI of Fig. 2;

Fig. 7 is a sectional view taken along the line VII—VII of Fig. 3;

Fig. 8 is a fragmentary view, partly in section and partly in elevation, of the device illustrating the handle in its supporting plate; and Fig. 9 is a view similar to Fig. 7 illustrating the handle in an intermediate position.

Referring to the accompanying drawings in which like reference characters indicate like parts in the several figures, I show an electrical cooking device 10 having an upper cooking plate 12 and a lower cooking plate 14 mounted within casings 16 and 18, respectively, and supported by the lower casing 18 and legs 20. A hinge mechanism 22 connects the plates 12 and 14 at one side, permitting the upper plate 12 to be moved with respect to the lower plate 14, and a handle 24 is rotatably attached to the upper plate 12 so as to be maintained in either a substantially horizontal position during the closed operation of such device or a substantially vertical position during the opened position of the upper plate.

The cooking plates 12 and 14 are, in this instance, removably attached to the casings 16 and 18 and are electrically heated by means of suitable electrical heating elements (not shown) positioned relatively close thereto in a well known manner as will be readily understood, power being supplied to such heaters by means of the plug receptacle 26, as is customary. The upper cooking plate cooperates with the lower plate and is superimposed thereupon during the closed operation of the device as, say, a sandwich grill or a waffle iron (see Figs. 1, 2, 3 and 6). However, the upper plate is hingedly attached to the lower plate by means of the hinge mechanism 22. This hinge mechanism 22 permits the upper plate hinge support to be moved vertically with respect to the upper plate as well as to be rotated thereabout to permit the upper plate and its associated casing 16 to be rotated substantially 180°, whereupon the upper plate will be in substantially the plane of the lower plate. This arrangement of the cooperating plates 12 and 14 permits the cooking device 10 to be used as an open grill, for example (see Fig. 5).

The casings 16 and 18, respectively, located about the plates 12 and 14, are positioned thereabout and removably attached thereto in a well known manner. The lower casing 18 functions as a suitable support for the cooking device, in addition to a housing for the lower heating element (not shown). However, suitable legs 20 may be attached to the lower portion of the lower casing 18 to retain such casing upon, say, a table, or the like, in a well known manner.

Inasmuch as the interior structure including the thermostat, wiring arrangement and heating elements of a sandwich grill, waffle iron, or the like, are well known, and inasmuch as the particular structure used in the device 10 has no direct bearing on my present invention, it is believed unnecessary to illustrate the same.

The handle 24 rotatably attached to the upper cooking plate 12 comprises, in this instance, a bracket 30, a retaining plate 32, a supporting stub shaft 34 and a resilient member 36. The bracket 30 comprises, in this instance, an elongated member having rearwardly extending end and top portions formed out of lightweight metal. The rear edges of such portions are shaped so as to fit tightly against and conform with the configuration of the outer surface of the upper casing 16. Rearwardly extending ears 39 extend from the end portions of the bracket 30. A plurality of apertures 38 and 40 are located within the main portion of bracket 30. The apertures 38 are, in this instance, substantially rectangular in shape and are adapted to receive suitable retaining ears as hereinafter described. The aperture 40 is substantially centrally located for receiving the inner end of the stub shaft 34 as subsequently set forth.

The retaining plate 32 comprises, in this instance, an elongated substantially rectangular relatively narrow lightweight sheet metal member having up-turned relatively narrow retaining ears 42 punched therein to engage with the bracket 30 to retain such plate 32 in a predetermined position. A centrally located aperture 44 is positioned within the plate 32 to receive the stub shaft 34 and to pass therealong as hereinafter described.

The handle 24 comprises, in this instance, an elongated relatively narrow member having an inwardly extending boss 45 located within its rear edge. The retaining plate 32 is rigidly attached to the rear edge of the handle 24 by means of suitable set screws 33, substantially coaxially with boss 45 and when in such a position the retaining ears 42 extend rearwardly so as to cooperate with the bracket 30 by passing through apertures 38 in such bracket 30, in one position, and to fit above and below the top and bottom of bracket 30, in a second position to retain such handle in its two predetermined operating positions.

The handle 24 is, in this instance, formed of a phenolic resin and may have any desired exterior design or configuration which conforms with the general appearance and configuration of the cooking device to which it is attached. In other words, inasmuch as the handle 24 is retained in its various operating positions by suitable mechanisms retained within and along the rear edge of the handle in a normally unseen position which in no way restricts or limits the design or configuration of the outer surface of the handle, such exterior design of the handle may then be made to conform with any of the recently designed waffle irons, sandwich grills, or the like, and may be easily changed to conform with any desired changes in the design of such structures.

The stub shaft 34 comprises, in this instance, an elongated cylindrical member having an exterior flange 35 at its lower or outermost end (see Figs. 6, 7 and 8). The upper or inner end of the stub shaft is then passed through and rigidly attached to the bracket 30 which, in turn, supports such shaft. A suitable helical resilient member 36 is positioned about the stub shaft 34 and engages the flange portion 35 thereof and the latching plate 32. The resilient member 36 is in this instance retained under compression so as to bias the plate 32 and the attached handle 24 inwardly toward the upper plate in casing 16.

When assembling the handle mechanism embodying my invention, the resilient member 36 is positioned upon the stub shaft 34. The retaining plate 32 and bracket 30 are then positioned upon the resilient member and about the upper end of such shaft. The upper end of the stub shaft 34 is then riveted to or spun over tightly against the central portion of the bracket 30. The handle 24 with the aperture 45 located upon the rear edge thereof is then positioned against the retaining plate 32, whereupon suitable screws 33 may be passed therethrough so as to engage the handle 24 to retain such handle tightly against the latching plate. The inwardly extending aperture 45 is thus adapted to receive the stub shaft 34 and the resilient member 36.

The handle 24, bracket 30, retaining plate 32, stub shaft 34 and resilient member 36 may then be classified as a unitary structure.

This combination structure is then attached to the upper casing 16 and upper cooking plate 12 by positioning the bracket 30 against the side thereof and permitting the ears 39 of the bracket 30 to pass through the apertures 37 in the casing 16. The ends and top of the bracket 30, being of such size and configuration as to fit against the side of the casing 16, ensure such bracket and associated parts being located tightly thereagainst. The ears 39 having passed through the apertures 37 in the casing 16 are then twisted to retain such bracket and its associated parts in direct engagement with the upper casing 16 and plate 12.

The handle mechanism is, accordingly, rigidly attached to the upper cooking plate 12 and casing 16, and is, therefore, in a position to enable an operator to readily move such plate and casing when needed. The handle 24 is thus rotatable about an axis extending towards the upper plate and located above such plate when the handle is normally retained in its first operative position substantially parallel to such upper cooking plate 12, see, for example Figs. 2, 3 and 6.

When it is desired to move the handle 24 to its second operative position, or the position used when the top plate 12 is in its open position, such handle is grasped and pulled outwardly (see Figs. 4 and 9). The retaining plate 32 and cooperating ears 42 being rigidly attached to such handle, likewise move outwardly away from the casing 16, additionally compressing the resilient member 36 and enabling the ears 42 to become disengaged from the bracket 30. The handle 24 may then be readily rotated substantially normal to the upper plate 12 to a position where the ears 42 will be located one above and one below the top and bottom edge of the bracket 30. The handle upon being released by the operator is then free to move inwardly toward the casing 16 in response to the resilient member 36, whereupon the ears 42 overlap the top and bottom edge of bracket 30 so as to prevent the handle from rotating (see Fig. 8). It is not necessary for the ears 42 to tightly engage the edges of bracket 30, so that an exact positioning of the handle is not required in order to cause the handle to assume its desired supporting position. Either end of the handle, depending upon which is in its lower position, is therefore adapted to rest upon the suitable support for the electrical device, retaining the top cooking plate thereof substantially within the plane of the lower cooking plate 14 (see Fig. 5), at which time the axis of such handle is below the top plate.

It is, therefore, obvious that the handle 24 is resiliently biased toward the upper cooking plate and is retained in either of two operative positions, one being substantially parallel to the cooking plate during its closed operation, and the other being substantially at right angles to the cooking plate for retaining such plate in the plane of the lower cooking plate when in an open position.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim as my invention:

1. A grid comprising a pair of cooperating heating plates adapted to occupy a closed position, hinge means connecting said plates together providing for relative movement of said plates to a fully opened position, a handle secured to one of said plates arrangeable in one position to support said one plate in a fully opened position, said handle being rotatable about an axis extending towards said one plate.

2. A grid comprising a pair of cooperating heating plates adapted to occupy a closed position, hinge means connecting said plates together providing for relative movement of said plates to a fully opened position, a handle secured to one of said plates arrangeable in one position to support said one plate in a fully opened position, said handle being rotatable about an axis extending towards said one plate and located thereabove when said plate occupies said closed position.

3. A grid comprising a pair of cooperating heating plates adapted to occupy a closed position, hinge means connecting said plates together providing for relative movement of said plates to a fully opened position, a handle secured to one of said plates arrangeable in one position to support said one plate in a fully opened position, said handle being rotatable about an axis extending towards said one plate and located therebelow when said plate occupies its fully opened position.

4. A grid comprising a pair of cooperating heating plates adapted to occupy a closed position, hinge means connecting said plates together providing for relative movement of said plates to a fully opened position, a handle secured to one of said plates arrangeable in one position to support said one plate in a fully opened position, said handle being rotatable about an axis extending towards said one plate and passing through an intermediate part of such handle.

5. A grid comprising a pair of cooperating heating plates adapted to occupy a closed position, hinge means connecting said plates together providing for relative movement of said plates to a fully opened position, a handle secured to one of said plates arrangeable in one position to support said one plate in a fully opened position, said handle being rotatable about an axis extending towards said one plate and passing through the middle of such handle.

6. In an electrical cooker comprising a pair of superposed cooking plates, means associated with the lower of said plates for supporting the plates in an elevated position, hinge means connecting said plates arranged so that the upper plate can be swung to an open position wherein its cooking surface lies substantially in the plane of the cooking surface of the lower plate, a handle rotatably connected to the upper plate retained in a plane substantially parallel to said plates when in their closed position and movable to a position wherein a side thereof will support said upper plate in said open position, and retaining means carried by the handle arranged to cooperate with the upper movable plate to retain said handle in either of its two positions.

7. A handle mechanism for a grill having cooperating heating plates having one plate retained above the other when in their closed operating position and the top plate being retained in substantially the plane of the bottom plate when in their open position, comprising an elongated handle, a bracket attached to the top plate, a retaining plate attached to the rear edge of the handle, and resilient means cooperating with the bracket and retaining plate biasing the handle and retaining plate toward the bracket and top plate, said retaining plate cooperating with the bracket to retain the handle either substantially parallel to the top plate or at substantially right angles hereto so that the side of such handle will support the top plate in its open position in substantially the plane of the bottom plate.

8. A handle mechanism for a grill having cooperating heating plates having one plate retained above the other when in their closed operating position and the top plate being retained in substantially the plane of the bottom plate when in their open position, comprising an elongated handle, a bracket attached to the top plate having a plurality of apertures therein, a retaining plate attached to the rear edge of the handle, a plurality of rearwardly extending ears attached to such retaining plate, and resilient means cooperating with the bracket and retaining plate biasing the handle and retaining plate toward the bracket and top plate, said retaining plate cooperating with the bracket to retain the handle either substantially parallel to the top plate with the ears attached to the retaining plate passing through the apertures in the bracket, or at substantially right angles thereto so that the side of such handle will support the top plate in its open position in substantially the plane of the bottom plate with the ears attached to the retaining plate fitting one above and one below said bracket.

BERNARD F. PARR.